(12) United States Patent
Donaldson (10) Patent No.: US 6,996,848 B2
(45) Date of Patent: *Feb. 14, 2006

(54) ANTI-OSTEOARTHRITIS AND ANTI-HYPOTHERMIA GARMENT AND DEVICE

(76) Inventor: Archie R. Donaldson, P.O. Box N-4871, Nassau (BS)

( * ) Notice: Subject to any disclaimer, the term of this patent is extended or adjusted under 35 U.S.C. 154(b) by 65 days.

This patent is subject to a terminal disclaimer.

(21) Appl. No.: 10/317,144

(22) Filed: Dec. 12, 2002

(65) Prior Publication Data

US 2003/0079268 A1    May 1, 2003

Related U.S. Application Data

(60) Division of application No. 10/212,213, filed on Aug. 6, 2002, now abandoned, which is a continuation-in-part of application No. 09/934,755, filed on Aug. 23, 2001, now Pat. No. 6,574,799.

(51) Int. Cl.
*A41D 13/00* (2006.01)

(52) U.S. Cl. .......................................................... 2/16
(58) Field of Classification Search .................... 2/455, 2/456, 16, 59, 60, 61, 62, 69, 465, 22, 24, 2/2.15, 79, 1, 458, 468, 44–45, 87, 2.16, 2/93, 94, 97, 102, 108, 114, 159, 162, 239, 2/227, 311, 268, 910, 915, 917, 919, 125, 2/126, 170, 905, 906; 128/878, 881–882; 602/2–7, 20, 23, 25, 26, 27, 61, 63, 64, 65, 602/75, 76; 607/96, 108, 117; 219/527, 219/529, 211
See application file for complete search history.

(56) References Cited

U.S. PATENT DOCUMENTS

| | | | |
|---|---|---|---|
| 1,329,025 A | 1/1920 | Smith | |
| 1,602,454 A | 10/1926 | Riddell | |
| 1,691,472 A | 11/1928 | Graham et al. | |
| 2,494,987 A | 1/1950 | Chaitin | |
| 2,831,198 A | 4/1958 | Datlof | |
| 2,911,974 A | 11/1959 | Spence | |
| 2,976,539 A * | 3/1961 | Brown, Jr. ..................... | 2/93 |
| 3,074,405 A | 1/1963 | Duensing | |
| 3,322,118 A | 5/1967 | Sotherlin | |
| 3,446,395 A | 5/1969 | Enicks | |
| 3,710,395 A | 1/1973 | Spano et al. | |
| 3,742,518 A | 7/1973 | Garcia | |
| 3,829,901 A | 8/1974 | Massetti et al. | |
| 3,895,638 A | 7/1975 | Ito | |
| 4,042,803 A | 8/1977 | Bickford | |
| 4,107,509 A | 8/1978 | Scher et al. | |
| 4,229,833 A | 10/1980 | Cox et al. | |

(Continued)

*Primary Examiner*—Tejash Patel
(74) *Attorney, Agent, or Firm*—Ditthavong & Carlson, P.C.

(57) ABSTRACT

A multilayered material is provided that exhibits therapeutic effects for relieving the pain and swelling of various forms of arthritis (particularly osteoarthritis), delaying the onset of osteoarthritis, or preventing hypothermia or alleviating conditions caused by hypothermia. The flexible, breathable multilayered material includes a first layer of soft and hypoallergenic material (e.g., cotton, silk, linen), a second layer of soft, heat retentive material (e.g., wool, cashmere) contacting the first layer, and a third layer of water repellent material contacting the second layer. Additionally, the multilayered material provides a thin, flexible, breathable fabric that can be used to construct various garments, devices, and gears to combat harsh weather conditions.

6 Claims, 7 Drawing Sheets

U.S. PATENT DOCUMENTS

| | | |
|---|---|---|
| 4,276,341 A | 6/1981 | Tanaka |
| 4,356,570 A | 11/1982 | Vernon et al. |
| 4,569,874 A * | 2/1986 | Kuznetz .................... 428/109 |
| 4,583,247 A * | 4/1986 | Fingerhut et al. ................ 2/69 |
| 4,832,010 A | 5/1989 | Lerman |
| 4,961,418 A | 10/1990 | McLaurin-Smith |
| 4,985,934 A | 1/1991 | Perry |
| 5,029,344 A * | 7/1991 | Shannon et al. ................ 2/69 |
| 5,035,001 A | 7/1991 | Novick |
| 5,622,762 A | 4/1997 | Perla |
| 5,638,546 A | 6/1997 | Vita |
| 6,574,799 B1 * | 6/2003 | Donaldson ...................... 2/16 |

* cited by examiner

ANTI-OSTEOARTHRITIS AND ANTI-HYPOTHERMIA GARMENT AND DEVICE

RELATED APPLICATIONS

The present application is a divisional of U.S. patent application Ser. No. 10/212,213 filed on Aug. 6, 2002 Now abandoned, which is a Continuation-In-Part of U.S. patent application Ser. No. 09/934,755 filed on Aug. 23, 2001; Now U.S. Pat. No. 6,574,799 the contents of which are hereby incorporated by reference.

FIELD OF THE INVENTION

The present invention relates to textile fabrics, and more particularly to a multilayered material used to construct garments, gears, or devices capable of providing therapeutic effects relating to various forms of arthritis (particularly osteoarthritis) and conditions associated with hypothermia.

BACKGROUND OF THE INVENTION

Usability of a material in the construction of garments, gears, and devices depends largely on whether the material can be readily manipulated and that the material can effectively exhibit certain desired characteristics. For instance, clothing and gear manufacturers are continually seeking out materials to satisfy the demands of its customers for comfortable, lightweight garments and gears to provide protection against the elements (i.e., harsh weather conditions stemming from extreme temperatures and/or rain, sleet, and snow). Conventionally, to achieve the desired protection against the weather, manufacturers have utilized fabrics that are difficult to handle because of their inflexibility and bulkiness. Fabric material characteristics are also critical in the product of medical garments and devices. Manufacturers of therapeutic garments and devices are likewise tasked with developing new products to address various medical conditions. Because of the limitations of the materials used to construct such products, aesthetics and comfort are sacrificed. Therefore, the material characteristics sought after by clothing and gear manufacturers and that of medical garments and devices manufacturers are traditionally divergent, with respect to comfort, aesthetics, and functionality.

To combat harsh weather conditions, a waterproof material (e.g., rubber, plastics) is employed to prevent moisture from entering the garment. For example, one traditional construction of a wet suit provides a bonded layer to form a solid film of a water resistant contact cement to resist any transfer of water. The materials used in a wet suit do not permit wide application to other garments, in part because of its bulkiness and because it cannot be worn for a long period of time.

Another consideration on the desirability of materials is whether they cause any allergic reaction with the skin. For instance, foam rubber is not a material that should be in contact with the skin for any length of time, as it can cause severe irritation and does not allow the escape of perspiration.

For therapeutic applications, conventional garments localize heat and moisture using non-porous materials, such as plastics or rubber, to cover the particular afflicted area of the body. One drawback with such an approach stems from the fact that plastics are non-porous and causes perspiration buildup. This buildup of moisture does not permit the garment to be worn for any extended period of time, and thus, may detract from any therapeutic effect. These materials, however, are suitable for outdoor garments and gears, as they are not worn for any extended period.

Therefore, there is a need for a material that provides therapeutic effects. There is also a need for a material that can be used to construct a wide range of garments, gears, and devices. Additionally, there is a need for a material that is a non-irritant. There is also a need for a material that is thin, lightweight, flexible, and water-repellent. Further, there is a need for a material that can be worn for a prolonged period of time, without any ill effects.

SUMMARY OF THE INVENTION

These and other needs are addressed by the present invention, in which a multilayered material can be used to construct a garment, a device, or a gear for exhibiting therapeutic effects for relieving the pain and swelling of various forms of arthritis (particularly osteoarthritis), delaying the onset of osteoarthritis, or preventing hypothermia or alleviating conditions caused by hypothermia. The material is flexible, and breathable, and can retain as well as augment body temperature of the body parts covered by the material to well above that of the normal body temperature. The multilayered material can be used to avoid "tight-fitting" application to any of the body parts that are covered by the material, thereby advantageously eliminating the reduction of circulation. The multilayered material can be used to produce garments that are light-to-medium weight and provide medical benefits, physical fit, and a cosmetic appearance. The present invention advantageously permits a garment, device, or gear constructed from the multilayered material to be worn continuously for a prolonged period, if necessary, without any adverse effects because of its breathability. An inner layer, according to one embodiment, is soft, flexible, breathable, light-to-medium weight, and hypoallergenic (i.e., does not cause allergic reaction or skin irritation). A middle layer is soft, flexible, breathable, light-to-medium weight, heat retentive and augmentative, and can be made to meet the requirements of the particular body parts. An outer layer, according to an embodiment of the present invention, provides water-repellent characteristics to withstand various types of weather conditions, including water immersion; the outer layer is flexible, light-to-medium weight, breathable, and synthetic. The multilayered material can also be used to construct a number of devices and gear. Furthermore, the material can be further layered to accommodate more extreme weather conditions. The above arrangement advantageously provides a multilayered material that has wide applicability, enables continuous use, and exhibits therapeutic effects.

In one aspect of an embodiment of the present invention, a multilayered material includes a first layer of soft and hypoallergenic material, a second layer of soft, heat retentive material contacting the first layer, and a third layer of water repellent material contacting the second layer, wherein each of the layers is breathable.

In another aspect of an embodiment of the present invention, a multilayered garment includes a plurality of coverings aligned with respective areas of a body, wherein each of the plurality of coverings is multilayered fabric material that includes a first layer of soft, flexible, hypoallergenic, and breathable material, a second layer of soft, flexible, heat retentive, and breathable material overlaid on the first layer, and a third layer of water repellent, breathable material overlaid on the second layer.

In another aspect of an embodiment of the present invention, a method for constructing a garment, a device, or a gear is disclosed. The method includes layering a plurality of fabric materials according to a sequence indicating a first one of the fabric materials to be adjacent to a second one of the fabric materials to be adjacent to a third one of the fabric materials, wherein the first one of the fabric materials is soft, flexible, hypoallergenic, and breathable, the second one of the fabric materials is soft, flexible, heat retentive, and breathable, and the third one of the fabric materials is flexible, synthetic, water repellent, and breathable. The method also includes stitching the plurality of fabric materials to form the garment, the device, or the gear.

In another aspect of an embodiment of the present invention, a therapeutic garment includes a plurality of sections for loosely covering areas of a body. Each of the sections is a multilayered flexible and breathable material to retain body heat at the covered areas to delay the onset of forms of arthritis, relieving the pain thereof, and reducing effects of hypothermia. The multilayered material includes an inner layer of soft, flexible, breathable, and non-irritant fabric material, a middle layer of soft, flexible, and breathable fabric material having heat retention characteristics, and an outer layer of flexible, and breathable material having water repellent characteristics.

In another aspect of an embodiment of the present invention, a garment for enclosing selected movable joints of humans and animals subject to arthritis, osteoarthritis and hypothermia is disclosed. The garment includes a multilayered flexible, and breathable material having body heat retention and augmentation characteristics surrounding at least one of the joints of the body, in order to retain heat in such joints for delaying onset of forms of arthritis, relieving the pain thereof and reducing effects of hypothermia.

In yet another aspect of an embodiment of the present invention, a body joint covering for enclosing selected movable joints of humans and animals subject to arthritis, osteoarthritis and hypothermia is disclosed. The body joint covering includes a multilayered flexible material having two opposite open ends surrounding and containing the joint and retaining body heat in such joints which delays onset of forms of arthritis, relieving the pain thereof and reducing effects of hypothermia. The multilayered flexible material includes an inner tubular layer of soft, lightweight flexible fabric material that does not irritate the exterior surface of the joints; a middle tubular layer of soft, lightweight flexible fabric material having high heat retention characteristics; and an outer tubular layer of lightweight flexible synthetic material having water repellent characteristics. The inner tubular layer is retained by the two opposite ends while being spaced from and loosely worn around the selected movable joint to allow freedom of movement of the joint within the body joint covering while retaining heat thereabout.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and device for countering the effects of osteoarthritis and/or hypothermia are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
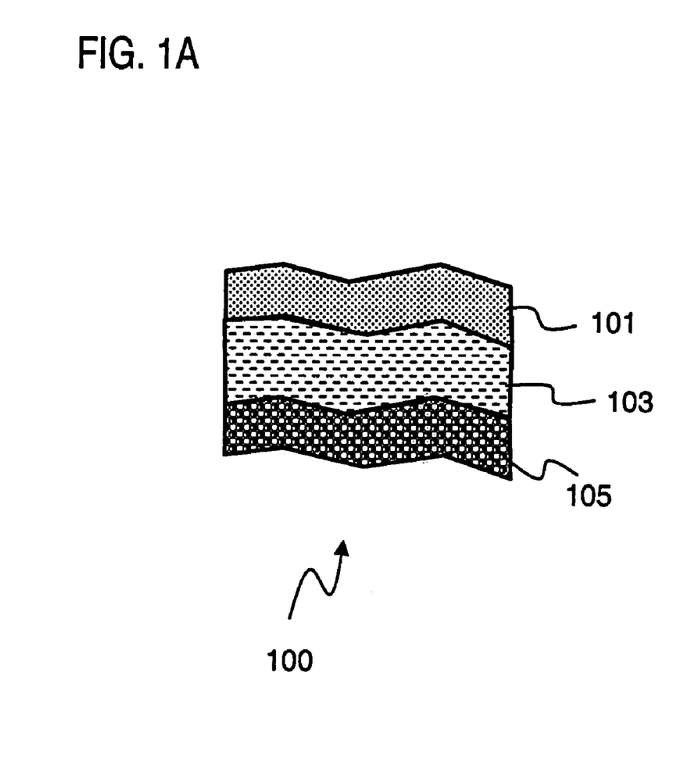
FIGS. 1A and 1B are diagrams of multilayered materials capable of providing heat retention and repelling water, in accordance with an embodiment of the present invention.
Figure 1B:
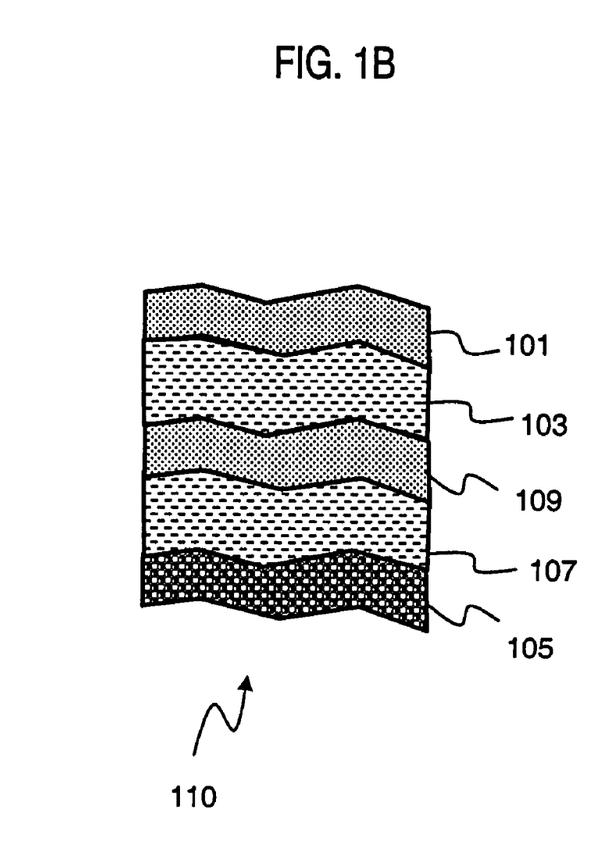

FIGS. 1A and 1B are diagrams of multilayered materials capable of providing heat retention and repelling water, in accordance with an embodiment of the present invention. As seen in FIG. 1A, a multilayered material 100, which is, flexible, and breathable, includes three layers: a water-repellent layer 101 that shields against water, a heat retentive layer 103 that exhibits high heat retention and augmentation characteristics, and a hypoallergenic (i.e., hypoallergic) layer 105 that is soft and minimizes allergic reactions. The material 100, according to one embodiment of the present invention, can be light to medium weight as to enable comfortable wear and continual prolonged use; however, depending on the particular application, a heavier weight can be utilized. In an exemplary embodiment, the material 100 can be used as a garment, whereby the layer 101 serves as an outer layer to shield against entry of moisture, and yet is breathable, the layer 103 is a middle layer, and the layer 105 provides an inner layer. According to one embodiment of the present invention, the inner layer 105 is soft, flexible, hypoallergenic, and breathable and can be made of cotton, linen, silk, etc., while the middle layer 103, which is soft, flexible, heat retentive (and/or augmentative), and breathable, includes natural furs, such as wool, cashmere, camel hair, and angora. In addition to being light to medium weight, cotton provides an easy to care for and comfortable knit fabric, and is non-allergenic. According to one embodiment of the present invention, on average, the thickness of each of the materials 100, 110 is about 1/8 of an inch; the actual thickness will depend on the particular application.

The water-repellent layer 101 is a synthetic (i.e., manmade), flexible, breathable material, such as a breathable nylon, to repel water and to withstand all types of weather conditions, including water immersion. Nylon is a strong fiber that is elastic and resistant to abrasion. It is noted that other water-repellent, breathable fabrics can be utilized; in general, two different kinds of water-repellent, breathable polymeric textile coatings exist. The first kinds are termed "microporous coatings" which provide breathability due to the presence of tiny pores present in the films; these pores block entry of water droplets, but are sufficiently large to pass water vapor. Examples of microporous, water-repellent, breathable textile coatings include the following synthetics: Gortex™ (Microporous Tetrafluorethylene), Entrant™ (Microporous Polyurethane), Ultrex™ (Microporous Polyurethane), Breathe™ Microporous Polyurethane, Exeltech™ (Microporous Polyurethane), and Celtech™ (Microporous Poly(amino acid)). The second types are "monolithic coatings," which are solid films (i.e., do not have any micropores), and therefore, they are impermeable to water; their breathability comes from the specific design of their molecular structure and molecular architecture. Examples of monolithic, waterproof, breathable textile coatings include the following: Sympatex (Monolithic Polyester), Witcoflex (Monolithic Polyurethane), and Bion-II Monolithic Polyurethane. Depending on the duration of the expected use of the garment, device, or gear, the selection of the outer layer 101 can be a microporous material for prolonged, continuous use, or the monolithic material for a relatively shorter duration.

When used as a garment for therapeutic applications, a detailed medical study has revealed that the combined layers 101, 103, 105 increase the temperature of the body parts that are covered by the material 100 well above that of the normal body temperature (i.e., therapeutic heat), while preventing trapping of moisture, so as to effectively treat musculo-skeletal disorder (or injury). That is, not only was body temperature retained, but in fact, augmented to a level that therapeutic effects are most effective. It is noted that all the layers 101, 103, 105 materials are breathable, including the outer water repellant layer 101. The combined layers 101, 103, 105 also provide a fabric that is durable, and washable.

The material 100, given the multilayered nature of the construction, provides therapeutic advantages with respect to delaying the onset of osteoarthritis, relieving arthritic pain and swelling, and preventing or delaying the development of hypothermia. To understand how the material 100 exhibits the noted therapeutic effects, the conditions of osteoarthritis and hypothermia are now described.

Osteoarthritis may be classified into two major sources of origin: (1) systemic, which may be related to age, sex, genetics and nutrition; and (2) traumatic, such as various injuries, weight, occupation, sports participation, and exposure to the elements. Osteoarthritis may viewed as a disease caused mainly by "wear and tear" of the body joints. It is for this reason that a "cure" is very difficult to achieve because of the constant injury, however slight, which exceeds the normal repair process.

Healthy cartilage, the slippery tissue that covers the ends of the bones of a joint, allows bones to glide over one another and absorb the shock of physical movements. Over time, the cartilage deteriorates, allowing the bones to rub together, which can cause pain, swelling and loss of motion. Other structures such as ligaments and muscles in proximity to the joints may become affected. Osteoarthritis may become even more widespread as the growing popularity of certain sports and stress exercises take place.

Most articulations are simple in structure. They are composed of two or more opposing, cartilage-covered bone ends, joined by a flexible tube of dense connective tissue, the articular capsule. An intimal layer of varying microscopic structures lines the capsule; this is referred to as the synovia or synovial membrane. This membrane, which heals much faster than the articular cartilage, requires about 90–100 days to repair after an injury. The very slow repair rate is the main drawback, in achieving a "cure" for osteoarthritis. Within this enclosed cleft is a small quantity of clear, viscid synovial fluid. The temperature of this fluid and surrounding parts may fall as much as 3–4 degrees Fahrenheit below the normal body temperature, when the joints are exposed to cold, due to the poor blood supply.

Adjacent to the joints are similar tissue components such as fascial layers, tendons, tendon sheaths, and bursae. Not only are these structures of great importance in the normal mechanical functions of the joints but also in the majority of articular diseases they are either primarily or secondarily affected.

The hyaline cartilage covering the bone ends at the articulations is an elastic, avascular, and cell-poor tissue. Its chief, if not sole, source of nourishment is the synovial fluid contained within the articular cavity. Compared with other connective tissue, articular cartilage has relatively little capacity for regeneration and repair following injury. Since articular cartilage is the recipient of most of the mechanical shocks and stresses that are exerted upon the skeleton, it is apparent that the maintenance of an entirely smooth articular surface, so essential to normal function, is constantly endangered. It has been clearly shown that articular cartilage is readily damaged by a wide variety of toxic agents, by acute injuries, and also by minor and repeated traumas that are incident to everyday activities.

The joints are anatomically and functionally adapted to permit easy motion within a certain range. They are also contained that the cartilage surfaces and the synovial tissues are subjected to frequent injuries of mechanical, toxic, and metabolic nature. In the case of cartilage, such injuries are not well tolerated because of certain inherent biologic characteristics which limit its ability to regenerate. The articular surfaces are prone, therefore, to undergo important regressive changes solely from physiologic aging and the wear and tear of daily use. Such alternations may be greatly accelerated because of deleterious agents, single or repeated trauma, or as the result of deranged mechanics from faulty posture or disturbed locomotion.

As regards hypothermia, this condition stems from lowered body temperature resulting from prolonged exposure to reduced temperatures.

Heat can be applied to certain forms of arthritis, especially osteoarthritis, to ease the discomfort caused by osteoarthritis. Conventional garments for keeping the entire body warm have been used to prevent the onset of hypothermia. Such garments are useful in their own particular applications, but none of them provide sufficient localized heat to the joints in order to prevent or to reduce the discomfort of osteoarthritis attacks to a satisfactory degree. The material 100 can be used to construct a garment that can be worn to reduce the development of osteoarthritic discomfort by preventing the sudden cooling of the joints. This garment can also be adorned by a person suffering from osteoarthritis, or subjected to low temperature for a period of time that results in hypothermia, to provide a retention of heat without adding to the person's discomfort, or causing injury by, for example, overheating the body, or perspiration buildup under the garment or devices. Garments, gears, and devices produced by the material 100 can withstand severe weather, enabling the wearer to enjoy the benefit of continuous heat generation.

For extreme weather conditions, such as below freezing temperatures, so that onset of hypothermia is probable, the material 100 can be further layered to create a material 110 (as shown in FIG. 1B). The material 110, thus, includes the water-repellent layer 101, the heat retentive layer 103, and the hypoallergenic layer 105. In addition, the material 110 has another heat retentive layer 107, and another water-repellent layer 109. According to one embodiment of the present invention, the heat retentive layer 107 is the same as the layer 103, and the water-repellent layer 109 is identical to the layer 101.

Figure 2:
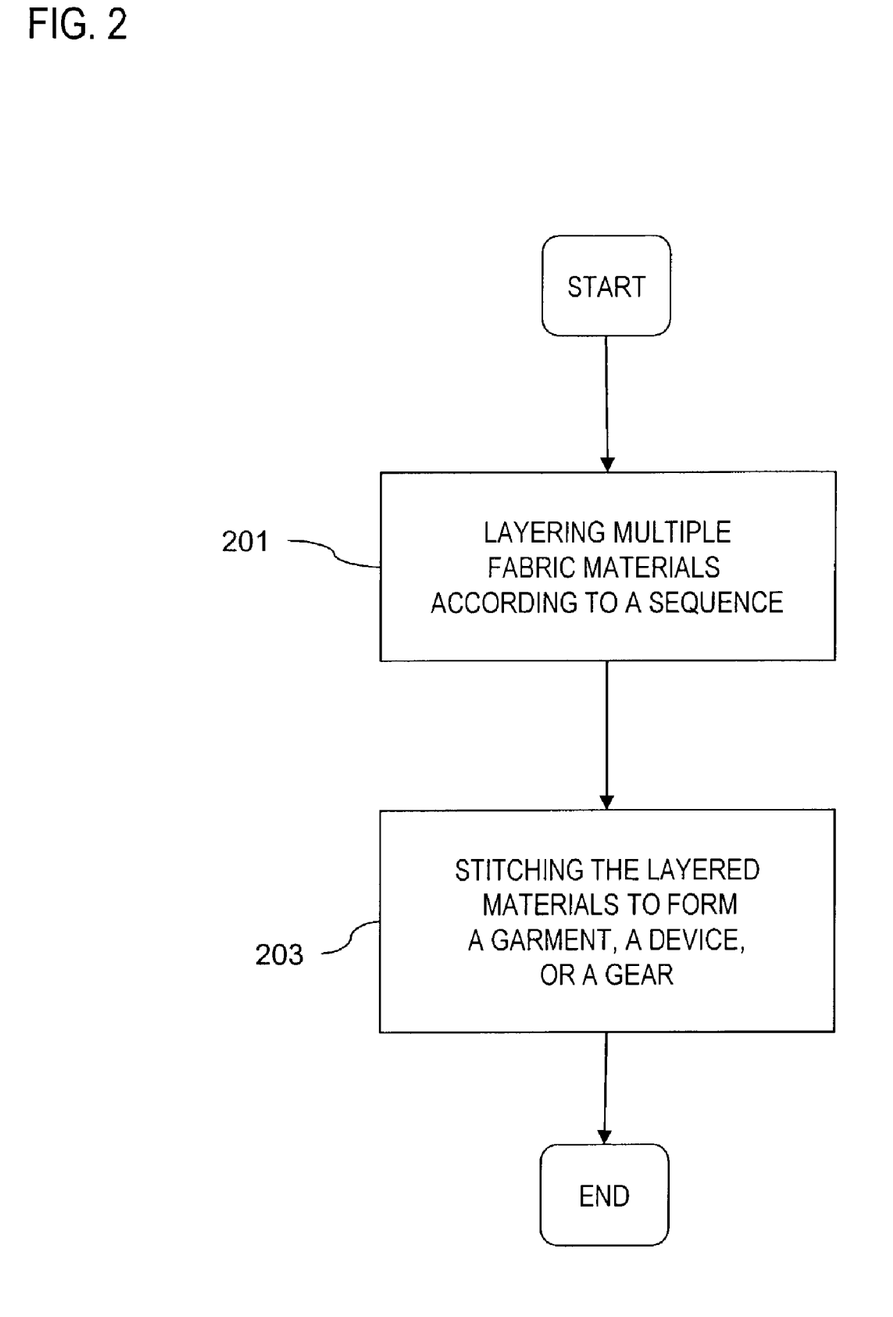
FIG. 2 is a flowchart of a process of constructing a multilayered material, in accordance with an embodiment of the present invention.

FIG. 2 is a flowchart of a process of constructing a multilayered material, in accordance with an embodiment of the present invention. In step 201, the layers 101, 103, 105 are placed according to a pre-determined sequence, as shown in FIG. 1A. Thereafter, a garment, gear, or device can be constructed by stitching the layers 101, 103, 105, as in step 203. The combined layers of materials 100, 110, which are highly flexible, lightweight, breathable, water-repellant, and insulative, can be utilized to construct garment, gears, or devices adapted to fit around or cover joints or the entire body, in order to keep joints and the body warm by the retention and augmentation of body heat (as more fully described with respect to FIGS. 3–10). The materials 100, 110 are applied loosely to the body area as to create an air gap, which promotes the retention of the heat. It is noted that it is not necessary to have medications or chemicals applied to any of the layers 101, 103, 105 to enhance their natural course of action.

The above procedure advantageously provides simple construction, thereby being economically feasible, long lasting and relatively trouble free in operation. The construction of the garment is such that there is no "tight-fit" on any of the body parts covered by the garment or device, thereby eliminating the reduction of circulation, which in turn reduces the amount of heat generated by prior garments and devices. The nature of the combined layers 101, 103, 105 permits the garment, gear, or device, to be made of lightweight materials and to provide medical benefits and be aesthetically pleasing. Furthermore, the garment can be worn twenty-four hours daily, without any adverse effects.

Figure 3A:
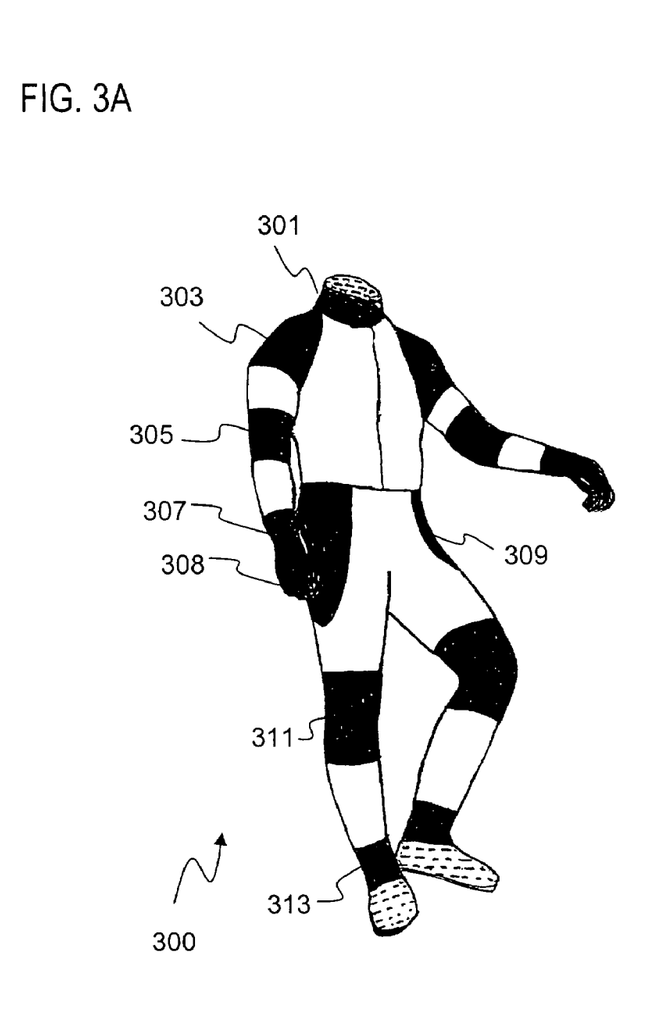
FIGS. 3A–3C are diagrams of various perspective views of a therapeutic garment, according to an embodiment of the present invention.
Figure 3B:
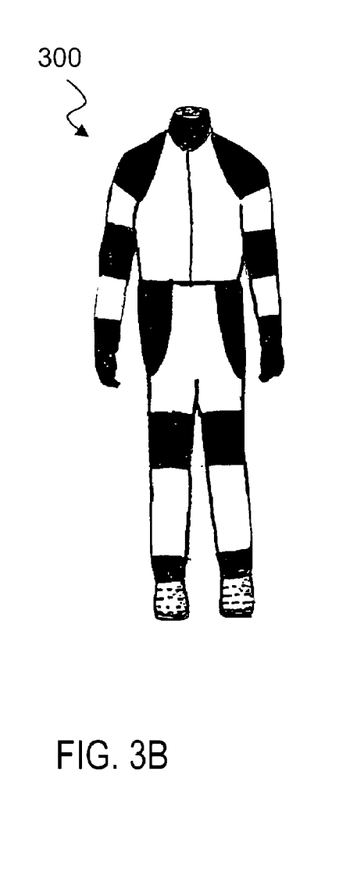
Figure 3C:
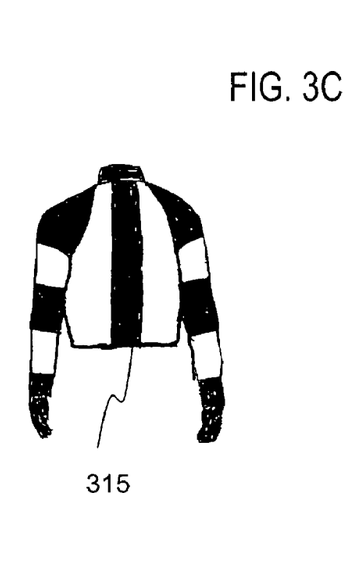

FIGS. 3A–3C are diagrams of various perspective views of a therapeutic garment, according to an embodiment of the present invention. A body suit 300 can be formed in which the material 100 can be applied to various areas of the body such that a person can select the particular coverage necessary to relieve that person's osteoarthritis pain and swelling or prevent or relieve effects of hypothermia. As seen in the figure, body coverings made of the material 100 are shown as the filled areas. For example, the body suit 300 includes a neck covering 301, shoulder coverings 303, elbow coverings 305, wrist coverings 307, gloves 308, hip coverings 309, knee coverings 311, and ankle coverings 313. FIG. 3B shows a frontal view of the body suit 300. FIG. 3C provides a diagram of the back of the upper body, in which a spine covering 315 is included. The insulating materials 100 (or alternatively 110) used to surround or cover the joints collectively provide a light-to-medium weight, flexible, breathable, hypoallergenic, and water-repellent fabric. The construction of this combination maximizes thermal insulation, retaining and augmenting a substantial portion of the body heat, while maintaining flexibility of the garment and devices, and allowing the covered part to "breathe." Because the fabric is lightweight, insulation provided by the coverings 301–315 to warm a person's joints, do not cause the person to become uncomfortably warm due to an insulation of the remainder of the body. For an example, a garment constructed in the form of a jogging garment would retain heat in the area of the joints in order to keep them warm, but would be cool in the lightweight intermediate areas so that the person does not become overheated.

The various coverings 301–315 keep the person's joints warm by the localized retention and augmentation of body heat, while allowing flexible movements of the joints in all types of weather conditions. The coverings 301–315, thus, can relieve osteoarthritis pain and swelling, as well as prevent or reduce hypothermia by retaining warmth in the person's body, especially in the joints, while avoiding buildup of moisture.

In an exemplary embodiment, the body suit 300 comprises two basic parts: a shirt (or top) garment and a trouser garment. The shirt garment covers the upper body from the neck to the waist, including the arms to the wrist. The shirt can be constructed as a one-piece unit, which slips over the body, or can be formed with a zipper or other fastening means to allow the garment to be slipped on and secured at the center of the body.

The dimensions of the body suit 300 and of the body coverings 301–315 are largely dependent upon the size and weight of the wearer, with the ultimate objective being to provide insulation sufficient to keep the joints of the body warm. For example, the shirt garment, designed for an adult, would have approximately the following dimensions: the insulating wrist covering would start at a point approximately an inch below the wrist and extend approximately 2 inches toward the elbow. Neck coverings 301 can be formed of a continuous cylinder surrounding the neck of the wearer and can be split in the front (back or side) with a closure. Also, the shoulder coverings 303 can extend from a point approximately 3 inches above the shoulder, over the shoulder joint, and down the outside of the arm, to a point approximately 5 inches below the shoulder, and approximately 3 inches down the inside from the armpit, from there they surround the upper arm and entirely surround the shoulder joint. Insulating elbow coverings 305 can be formed so that these coverings 305 extend approximately 2–3 inches on either side of the elbow joint. The spine covering 315 can be approximately 4–6 inches wide, extending from the neck region to the waist region, substantially along the entire length of the garment.

The trouser includes the hip coverings 309 to surround the hips, the knee coverings 311, and the ankle coverings 313. The material joining the insulating coverings 301–315, for example, can be made from lightweight, flexible, breathable, hypoallergenic material (e.g., cotton, or other fabrics with similar qualities). The approximate dimensions of the trouser, for an average adult wearer, are as follows. The hip coverings 309 extend from the waistline to a point approximately 8–10 inches down the outside legline and start from a point approximately 3–4 inches from the centerline of the body in the front around to a point approximately 3–4 inches from the centerline of the body in the back, and are formed in a generally oval manner downward, extending from the front of the body down the leg and back up to join in the back of the leg, up to the waist. The knee covering 311 is formed in a generally cylindrical shape, which surrounds and extends approximately 2–4 inches above the top of the knee, and 2–3 inches below the knee. The ankle covering is formed as a cylindrical cuff to surrounds and extend approximately 2–3 inches above the top of the ankle, and approximately 1.5–2 inches below the ankle joint.

In other embodiment of the present invention, the body suit 300 can be provided in the form of coverings for the hands and feet (e.g., gloves, socks and stockings). Also, a scarf can be made from the material 100, 110.

The body suit 300, as mentioned, can be constructed in several different ways. In one embodiment, the coverings 301–315 are joined to adjoining lightweight materials (shown as unfilled areas), for example by sewing, to form a uniform (or complete) garment. These adjoining lightweight materials can be made of any fabric, such as cotton, silk, and wool. In this exemplary embodiment, the shoulder coverings 303 can be sewn to the upper arm garment part, which in turn can be sewn to the elbow coverings 305. In this manner, all of the insulating coverings 301–315, and joining garment parts, can be joined to form a completed garment, which in this case is a body suit 300.

In an alternative construction, a lightweight base fabric garment can be constructed to cover substantially all of the desired portion of the body. To this lightweight flexible breathable hypoallergenic material, the insulating coverings 301–315 can be sewn over the joints in which heat is to be retained. In this case, the light-to-medium weight garment would serve as the lining (i.e., inner layer of the material 100) that is in contact with the wearer's body.

In addition to the body suit 300, the material 100 can be use to form other types of garments, gears, or devices. For instance, garments can be constructed to be worn as a shirt, blouse, jogging garments, dresses, sleeping pajamas, and two piece suits, which serve to alleviate discomfort or pain caused by cooling down after exercising, exposure to air conditioning, or simply cool weather. Also, undergarments can be constructed for wear under standard clothing, in order to alleviate the pain caused by exposure to cold environment; for example, air conditioning present in many modern office buildings and homes. Further, the material 100 can be used to provide stockings to retain heat sufficient to provide therapeutic effects for the knees and/or ankles.

Figure 4A:
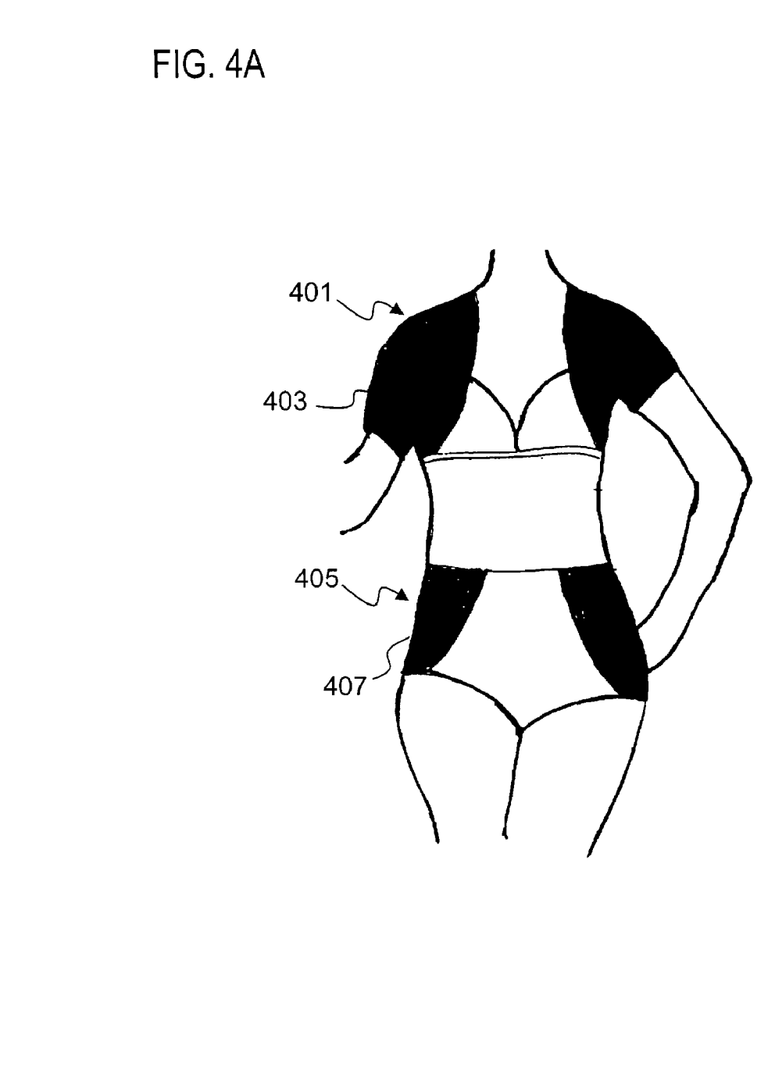
FIGS. 4A–4C are diagrams of various perspective views of an undergarment, according to an embodiment of the present invention.
Figure 4B:
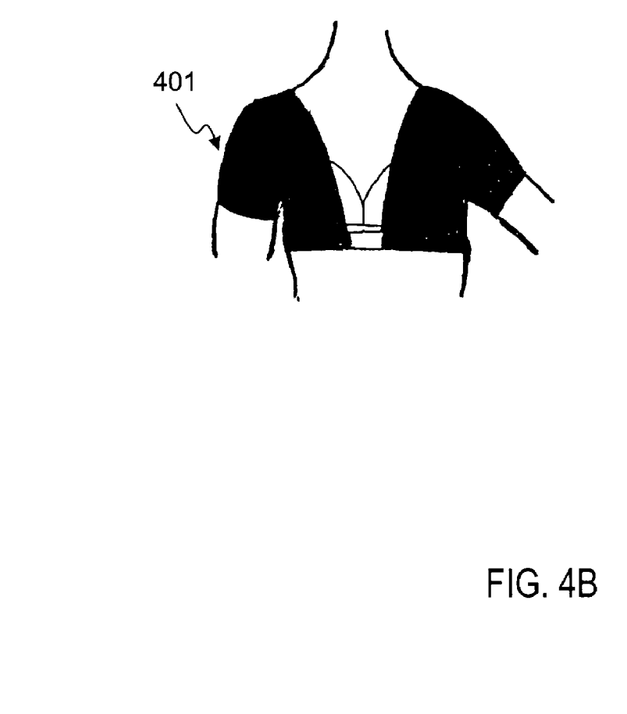
Figure 4C:
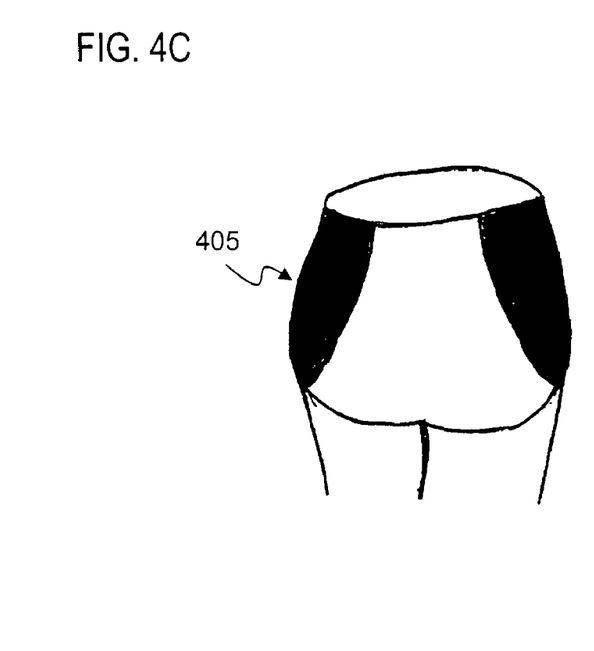

FIGS. 4A–4C are diagrams of various perspective views of an under garment. As described the material 100 has wide applicability, so that undergarments, such as brassieres and panties for women, or T-shirts and shorts for men, can be produced. As shown, a woman's brassiere 401 can be constructed with insulating shoulder coverings 403, which completely surround the shoulder joints. FIG. 4A also shows an underwear 405, in which hip coverings 407 that are made from the material 100 and surrounds the hip joints, can be joined with cotton, silk, or other similar material to form panties or shorts. FIG. 4B is a front plan view of the upper undergarment of FIG. 4A for covering the upper body. FIG. 4C is a back plan view of the lower undergarment of FIG. 4A for covering the hip area.

Figure 5:
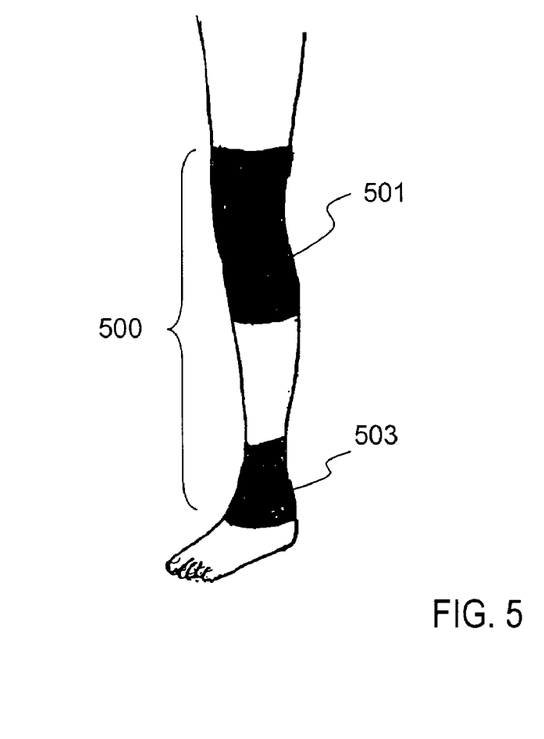
FIG. 5 is diagram showing use of the materials of FIGS. 1A and 1B constructed to cover knee and ankle joints.

FIG. 5 is diagram showing use of the materials of FIGS. 1A and 1B constructed to cover knee and ankle joints. In an exemplary embodiment, a legging 500 includes a knee cover 501 and an ankle cover 503 joined by, for example, a lightweight material. Alternatively, the knee cover 501 and the ankle cover 503 can be individual devices. As mentioned above, the material 100 has been tested with respect to osteoarthritis; the test focused on the most difficult joint to treat for this particular disease, i.e., the knee joint, because of the knee's strength and weight bearing function, especially when in motion. A knee device was tested on a number of patients, who were suffering from severe osteoarthritis of the knee. The evaluation lasted over a 2½ month period. During this test period, 39% of the subjects experienced elimination of swelling in the knee; 16% of the subjects reported elimination of both swelling and pain; 32% of the subjects reported no noticeable change in swelling; 45% of the subjects reported no change in the pain; and less than 1% reported a worsen condition. The fact that 39% of the subjects experienced elimination of the swelling, 16% had elimination of both the swelling and pain, 32% of the subjects did not have more swelling, and 45% of the subjects reported no increase in pain shows the effectiveness of the material 100, in light of the very slow regeneration of articular cartilage. Even though the testing period was only for 2½ months, the therapeutic merits of the combined layers 101, 103, 105 are evident, particularly in light of the fact that the synovial membrane requires about 90–100 days to repair after an injury and heals much faster than the hyaline (or articular) cartilage which covers the bone ends and is the recipient of most of the mechanical shocks and stresses that are exerted on the skeleton. The study has shown that the knee device stimulated a greatly accelerated healing processing, eliminating, reducing or holding steady the conditions of severe osteoarthritis of the knee, without even the use of any medication.

Figure 6:
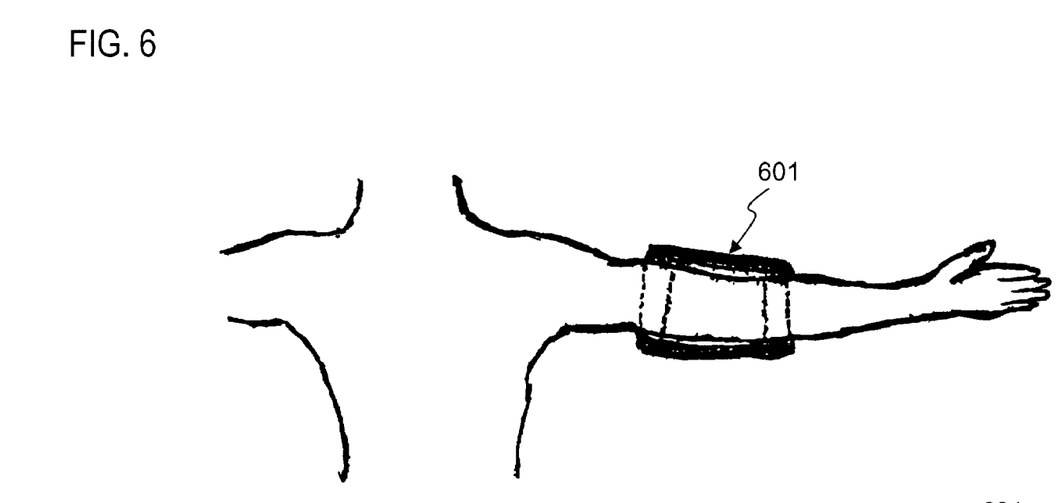
FIG. 6 is a diagram showing use of the multilayered materials of FIGS. 1A and 1B designed as an anti-osteoarthritis elbow device, wherein the device covers the elbow area through light elastic straps, according to an embodiment of the present invention.
Figure 7:
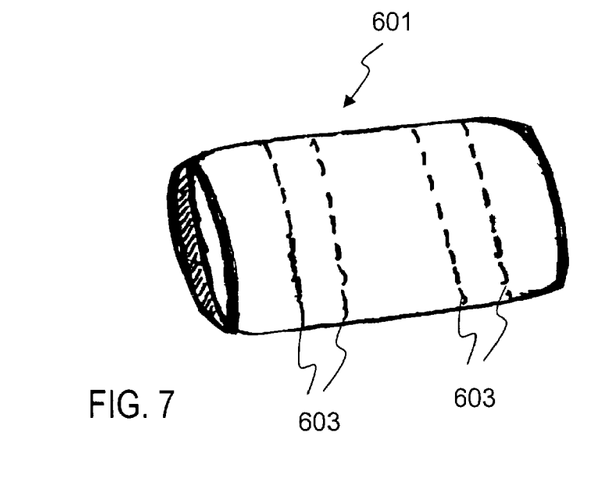
FIG. 7 is a diagram of the elbow device applied in FIG. 6.

FIG. 6 is a diagram showing use of the multilayered materials of FIG. 1 designed as an anti-osteoarthritis elbow device, wherein the device covers the elbow area and is held in place by light elastic straps; according to an embodiment of the present invention. As evident from FIG. 6, an elbow device 601 is applied loosely on the elbow area, sufficient to prevent "slippage." The device 601, in an exemplary embodiment, has four elastic straps 603 for loosely securing the device 601 around the elbow (shown in FIG. 7). These light elastic straps 603 are designed to keep the device 601 in place, and yet not decrease circulation to the area. By contrast, most conventional therapeutic devices provide a tight fit, which reduces blood supply to the joint and muscles, thereby undermining the therapeutic effects of the device. Other traditional approaches attempt to address this problem of constriction as well as perspiration buildup by leaving a large opening in the area directly over the joint; however, this reduces any benefit that such devices render, due to the heat loss from the exposed area. Slippage is even less of a concern with the present invention, because the material 100 can be incorporated into the garments, such as that of FIGS. 3 and 4.

As made clear by the previous discussion regarding the application of the materials 100, 110, a complete garment can be constructed for use in cold climate (or air-conditioned environment) for anti-hypothermia effect. Additionally, garments, gears, or devices, can be made to cover a particular part(s) of the body to produce therapeutic effect, especially anti-osteoarthritis of joints, as well as promoting healing of injured ligaments and muscles.

Further, a wide variety of garments, gears, and devices, which rely on the desirable characteristics of the material 100, 110, can also be formed, as enumerated in Table 1.

TABLE 1

| | |
|---|---|
| Garments: | Over-coats |
| | Winter jackets |
| | Fall jackets-short and mid-length |
| | Dresses |
| | Dress suits |
| | Jump suits |
| | Shorts (briefs) |
| | Panties |
| | Long underwear |
| | Sport clothes (e.g., skiing, mountain-climbing, hiking, golf, tennis, track and field, auto racing, ice skating) |
| | Military apparel |
| | Socks |
| | Stockings |
| | Robes |
| | Petticoats |
| | Pajamas |
| | Bathing suits |
| Gears: | Gloves |
| | Hats |
| | Tents |
| | Sleeping bags |
| | Shoes (footwear insulation) |
| | Slippers |
| | Rain coats |
| Gears (Continued): | Blankets |
| | Bed linen |
| | Pillow cases |
| | Diving suits |
| Devices: | Body joint coverings (e.g., neck, shoulder, elbow, wrist, hand, hip, knee, ankle, foot) |
| | Therapeutic brassiere |

Figure 8:
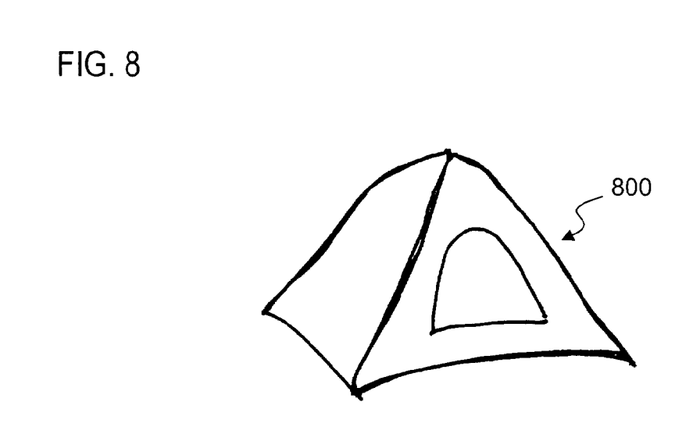
FIG. 8 is a diagram showing use of the multilayered material of FIGS. 1A and 1B to form a tent.
Figure 9:
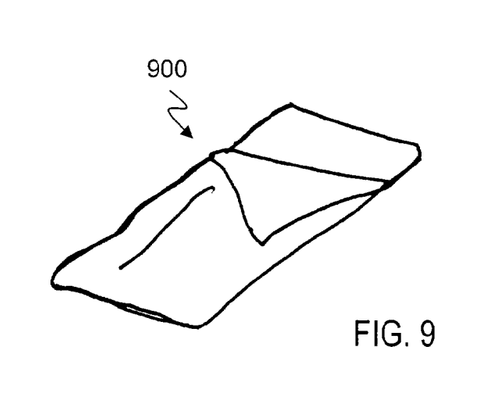
FIG. 9 is a diagram showing use of the multilayered material of FIGS. 1A and 1B to form a sleeping bag.
Figure 10:
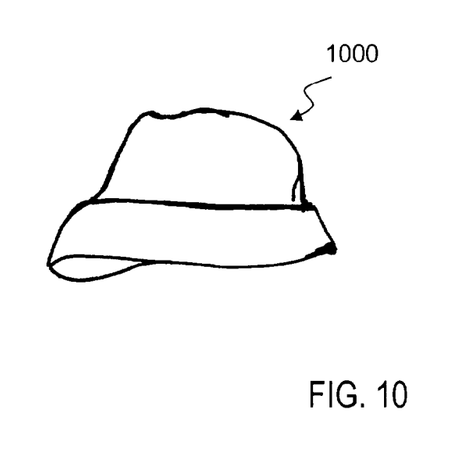
FIG. 10 is a diagram showing use of the multilayered material of FIGS. 1A and 1B to form a head gear.

For example, FIG. 8 shows use of the multilayered material of FIGS. 1A and 1B to form a tent 800. The sides of the tent 800 can be constructed using the material 110 for protection against cold temperatures and moisture (e.g., rain, sleet, and snow). Because of the breathable nature of the material 110, air circulation within the tent is enhanced. FIG. 9 shows use of the multilayered material of FIGS. 1A and 1B to form a sleeping bag 900. Because the materials 100, 110 are lightweight and flexible, the sleeping bag can be conveniently folded and stored. FIG. 10 illustrates use of the multilayered material of FIGS. 1A and 1B to form a head gear 1000.

Accordingly, the present invention provides a multilayered material that can be used in all types of weather conditions. The breathable multilayered material, according to one embodiment of the present invention, increases the temperature of the body parts covered by the material to well above that of the normal body temperature—i.e., retaining and augmenting body heat. The multilayered material can be used to avoid "tight-fitting" application to any of the body parts that are covered by the material, thereby advantageously eliminating the reduction of circulation. Conventional approaches employ a tight-fit, which in turn reduces the amount of heat generated by prior devices. The multilayered material can be used to produce garments that are light-to-medium weight and provide medical benefits, physical fit, and a cosmetic appearance. The present invention advantageously permits a garment, device, or gear constructed from the multilayered material to be worn continuously for a prolonged period, if necessary, without any adverse effects because of its breathability. An inner layer, according to one embodiment, is soft, flexible, breathable, light-to-medium weight, and hypoallergenic (i.e., does not cause allergic reaction or skin irritation). A middle layer is soft, flexible, breathable, light-to-medium weight, heat retentive and augmentative, and can be made to meet the requirements of the particular body parts. An outer layer, according to an embodiment of the present invention, provides water-repellent characteristics to withstand various types of weather conditions, including water immersion; the outer layer is flexible, light-to-medium weight, breathable, and synthetic. The multilayered material can also be used to construct a number of devices and gear. Furthermore, the material can be further layered to accommodate more extreme weather conditions. The multilayered material can also be used to construct a number of devices and gear (e.g., tents, sleeping bags, shoes, slippers, etc.). Furthermore, the material can be further layered to accommodate more extreme weather conditions. The above arrangement advantageously provides a multilayered material that has wide applicability, enables continuous use, and exhibits therapeutic effects.

While the present invention has been described in connection with a number of embodiments and implementations, the present invention is not so limited but covers various obvious modifications and equivalent arrangements, which fall within the purview of the appended claims.

What is claimed is:

1. A breathable body joint covering, comprising:
    a breathable multilayered material applied to a joint and retaining body heat in the joint for providing one of treatment of arthritis and reducing effects of hypothermia, wherein the multilayered material includes,
        an inner tubular layer of soft, lightweight flexible fabric material that is hypoallergenic,
        a middle tubular layer of soft, lightweight flexible fabric material having high heat retention characteristics, and
        an outer tubular layer of lightweight flexible synthetic material having water repellent characteristics,
    wherein the inner layer is loosely worn around the joint while retaining retain heat thereabout.

2. A body joint covering according to claim 1, wherein the body joint covering is sewn into a garment.

3. A therapeutic pad for covering a body part, comprising:
    a breathable multilayered material loosely applied to the body part as to retain body heat for providing one of treatment of arthritis and reducing effects of hypothermia, wherein the multilayered material includes,
        an inner tubular layer of soft, lightweight flexible fabric material that minimizes irritation to the body part,
        a middle tubular layer of soft, lightweight flexible fabric material having high heat retention characteristics, and
        an outer tubular layer of lightweight flexible synthetic material having water repellent characteristics.

4. A pad according to claim 3, wherein the multilayered material is breathable.

5. A pad according to claim 3, wherein the pad is sewn into a garment.

6. A method of constructing a therapeutic device for covering a body part, comprising:
    stitching a panel of a breathable multilayered material, the multilayered material being breathable and loosely applied to the body part to create an air gap as to retain body heat for providing one of treatment of arthritis and reducing effects of hypothermia, wherein the multilayered material includes,
        an inner tubular layer of soft, lightweight flexible fabric material that minimizes irritation to the body part,
        a middle tubular layer of soft, lightweight flexible fabric material having high heat retention characteristics, and
        an outer tubular layer of lightweight flexible synthetic material having water repellent characteristics.

* * * * *